T. S. Speakman,
Draw Bridge.
No. 76,542. Patented Apr. 7, 1868.
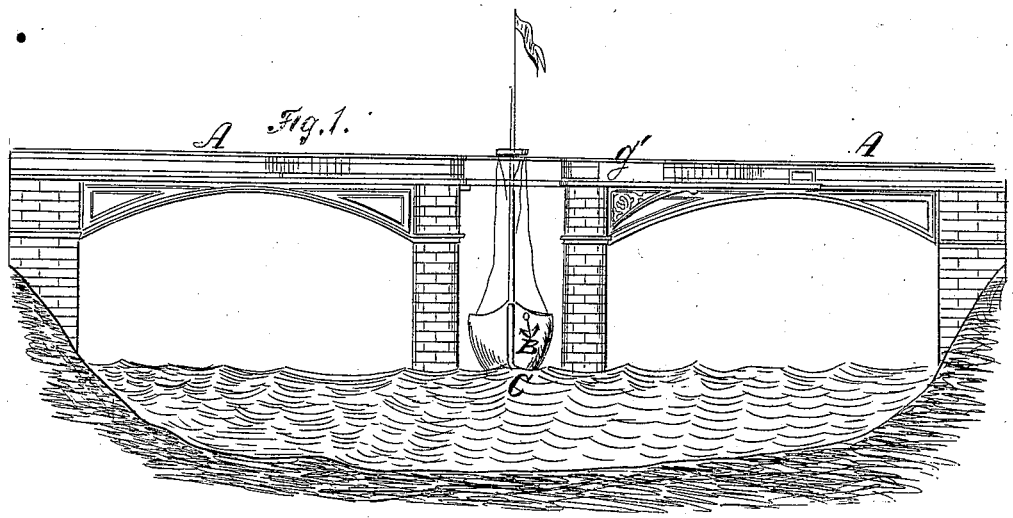
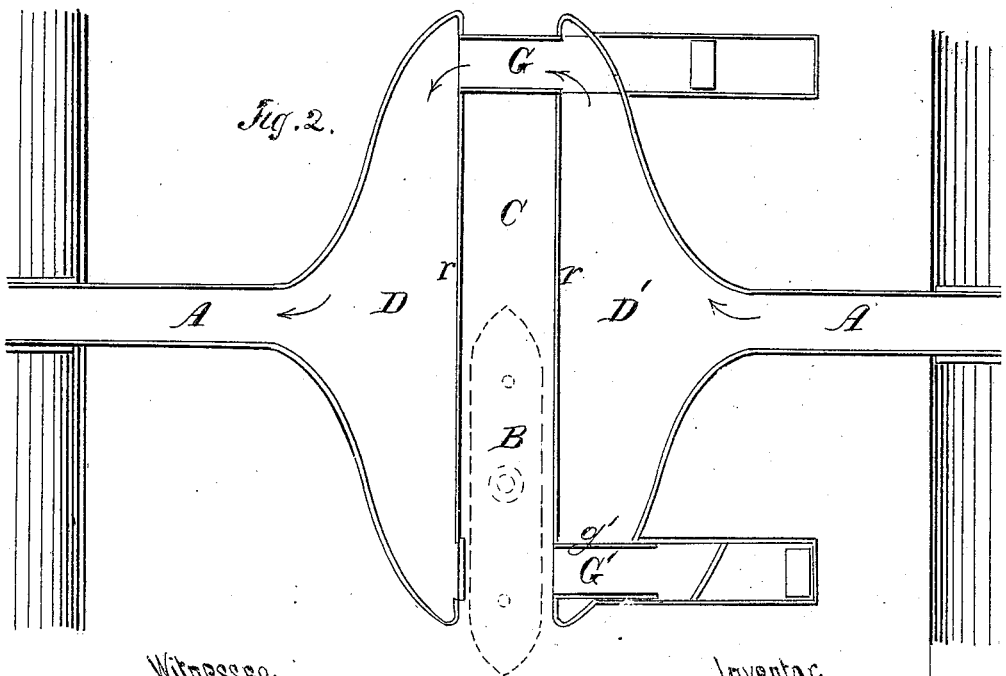
Witnesses: Chas. A. Pettit, J. W. Ellerinton
Inventor: T. S. Speakman
By Munn & Co.
Attorneys.

United States Patent Office.

THOMAS S. SPEAKMAN, OF CAMDEN, NEW JERSEY.

Letters Patent No. 76,542, dated April 7, 1868.

IMPROVED DRAW-BRIDGE.

*The Schedule referred to in these Letters Patent and making part of the same.*

TO ALL WHOM IT MAY CONCERN:

Be it known that I, THOMAS S. SPEAKMAN, of the city and county of Camden, and State of New Jersey, have invented a new and improved Double Draw-Bridge; and I do hereby declare that the following is a full, clear, and exact description of the construction and operation of the same, reference being had to the annexed drawings, (making a part of this specification,) in which—

Figure 1 is a side elevation.

Figure 2 is a plan.

In this invention the bridge is widened at the draw, and provided with two tracks or ways across the channel, so arranged and operating that a vessel passing the bridge cannot for a moment obstruct the travel across it.

In the drawings, A represents the main bridge, and C the channel, by which the vessel B is to pass the bridge. Along both sides of the channel I expand or widen the bridge, as shown at D D'. I then throw connecting draw-bridges, G G', across the ends of the channel, as seen clearly in fig. 2. The width of the bridge at D D' is expanded to such a degree, that a vessel coming up the stream can pass the lower connecting-bridge G', while the upper one, G, is shut, and travel across it is unimpeded, and, after the vessel passes into the space between the two draws, the lower one can be closed and the upper one opened, and, while the vessel is passing the upper one, travel will continue uninterrupted across the lower draw.

I would ordinarily employ slide-draws, though any kind may be used in connection with a bridge thus constructed. When the slide-draw is used, its inner rail, $g$ $g'$, will form a gate, which, when the draw is closed, will open the way for travel across it, and when the draw is open will close the approach to it, as seen at $g'$, fig. 2.

The space between the two draws must be graduated according to the size of the vessels that are liable to pass the bridge.

A rail, $r$ $r$, extends along the edge of the bridge, adjacent to the channel, from the rail $g$ to $g'$, to prevent accident.

Having thus described my invention, what I claim as new, and desire to secure by Letters Patent, is—

A bridge, constructed with the widened parts D D', with the channel C between them, and having two connecting draws G G', that span the channel, one at the upper and the other at the lower side of the bridge, substantially as and for the purpose specified.

To the above specification of my invention I have signed my hand, this 31st day of January, 1868.

THOMAS S. SPEAKMAN.

Witnesses:
CHAS. A. PETTIT,
SOLON C. KEMON.